US011003798B1

(12) United States Patent
Mhaske et al.

(10) Patent No.: US 11,003,798 B1
(45) Date of Patent: May 11, 2021

(54) SYSTEMS AND METHODS FOR ENFORCING AGE-BASED APPLICATION CONSTRAINTS

(71) Applicant: Symantec Corporation, Mountain View, CA (US)

(72) Inventors: Sharad Mhaske, Maharashtra (IN); Anand Darak, Pune (IN); Anuradha Joshi, Pune (IN)

(73) Assignee: NortonLifeLock Inc., Tempe, AZ (US)

( * ) Notice: Subject to any disclaimer, the term of this patent is extended or adjusted under 35 U.S.C. 154(b) by 333 days.

(21) Appl. No.: 16/133,750

(22) Filed: Sep. 18, 2018

(51) Int. Cl.
*G06F 21/62* (2013.01)
*G06F 21/32* (2013.01)
*G06F 21/60* (2013.01)

(52) U.S. Cl.
CPC ............ *G06F 21/629* (2013.01); *G06F 21/32* (2013.01); *G06F 21/604* (2013.01)

(58) Field of Classification Search
CPC .................................................... G06F 21/629
See application file for complete search history.

(56) References Cited

U.S. PATENT DOCUMENTS

| | | | | |
|---|---|---|---|---|
| 8,640,190 B1* | 1/2014 | Banerjee | ............... | G06F 21/604 726/1 |
| 9,536,101 B1* | 1/2017 | Demov | ............... | H04L 63/0245 |
| 9,785,928 B1* | 10/2017 | Brandwine | ......... | G06F 9/45533 |
| 2003/0033539 A1* | 2/2003 | Cheng | ............... | G06Q 20/3821 726/29 |
| 2007/0199058 A1* | 8/2007 | Baumgart | ............... | G06F 21/42 726/9 |
| 2013/0036448 A1* | 2/2013 | Aciicmez | ............... | G06F 21/53 726/1 |
| 2013/0091583 A1* | 4/2013 | Karroumi | ........... | G06F 3/04886 726/26 |
| 2014/0041055 A1* | 2/2014 | Shaffer | ................... | G06Q 10/10 726/28 |
| 2016/0063314 A1* | 3/2016 | Samet | ................ | G06K 9/00268 348/78 |
| 2016/0226954 A1* | 8/2016 | Lee | ....................... | G06F 3/1415 |
| 2016/0366147 A1* | 12/2016 | Nguyen | ............. | H04N 21/4532 |
| 2017/0180400 A1* | 6/2017 | Demov | ............... | H04L 63/1483 |
| 2018/0173861 A1* | 6/2018 | Guidotti | .................. | G06F 21/45 |
| 2019/0220583 A1* | 7/2019 | Douglas | ................ | G06F 21/316 |

OTHER PUBLICATIONS

Simonite, Tom, "Facial Recognition Lets Apps Guess Your Age", accessed at https://www.technologyreview.com/s/427381/facial-recognition-lets-apps-guess-your-age/, accessed on Apr. 2, 2012, 4 pages.

* cited by examiner

*Primary Examiner* — Ponnoreay Pich
(74) *Attorney, Agent, or Firm* — FisherBroyles, LLP

(57) ABSTRACT

The disclosed computer-implemented method for enforcing age-based application constraints may include (1) receiving a selection of age-based use constraints to be associated with one or more applications installed on the computing device, (2) associating the age-based use constraints with the applications, (3) determining that a user attempting to access the applications does not meet the age-based use constraints, and (4) performing a security action that restricts user access to the applications when the user does not meet the age-based use constraints. Various other methods, systems, and computer-readable media are also disclosed.

20 Claims, 6 Drawing Sheets

SYSTEMS AND METHODS FOR ENFORCING AGE-BASED APPLICATION CONSTRAINTS

BACKGROUND

Privacy and security features on enterprise and consumer computing devices are often enforced through various content policies defining user access to certain applications based on various hierarchical categories. For example, mobile device security features may include user driven content policies enabling a device owner to manually select and lock applications typically associated with a high degree of privacy, such as financial and dating applications, while allowing utility, music, and gaming applications (typically associated with a low degree of privacy) to be safely shared with other users.

However, these traditional computing device content policies may often fail to address application access based on user age. For example, some applications typically associated with a low degree of privacy (e.g., music and gaming applications) may contain mature content that is appropriate for certain age groups, thereby potentially being problematic when a computing device is shared with a minor child. Moreover, even when a computing device owner locks a high privacy application on a computing device, this action may often include a viewable lock notification associated with the application which may not be protected with a passcode (thereby allowing any user to "unlock" the application by responding to the notification) or alternatively, for locks that are passcode protected, allow an underage user to acquire private information associated with the device owner without accessing the application itself (e.g., a child may identify a well-known dating application on their parent's mobile device).

SUMMARY

As will be described in greater detail below, the instant disclosure describes various systems and methods for enforcing age-based application constraints.

In one example, a computer-implemented method for enforcing age-based application constraints may include (1) receiving a selection of age-based use constraints to be associated with one or more applications installed on a computing device; (2) associating the age-based use constraints with the applications, (3) determining that a user attempting to access the applications does not meet the age-based use constraints, (4) and performing a security action that restricts user access to the applications when the user does not meet the age-based use constraints.

In some examples, the security action may include (1) applying the age-based used constraints to a launcher associated with accessing the applications, and (2) concealing the applications in the launcher to prevent the user from accessing the applications. In some embodiments, the applications in the launcher may be concealed by sandboxing the launcher.

In some examples, the age-based use constrains may include an age-based profile. In some embodiments, the security action may include (1) switching a current device profile on the computing device to the age-based profile and (2) restricting the user access to the applications based on the age-based profile. In some examples, switching the current device profile may include (1) modifying the current device profile to the age-based profile and (2) creating the age-based profile. In some embodiments, restricting the user access to the applications may include (1) concealing the applications from view on the computing device and (2) restricting one or more features of the computing device associated with accessing the applications.

In some examples, determining that the user attempting to access the applications does not meet the age-based use constraints may include (1) receiving a user request to access the applications, and (2) determining that an age of the user requesting to access the applications is below a threshold. In some embodiments, determining that the age of the user attempting to access the applications is below the threshold may include determining the age of the user based on (1) user facial recognition, (2) user voice recognition, (3) user fingerprint detection, and/or (4) user identification data. In some examples, the applications may include one or more application categories.

In one embodiment, a system for enforcing age-based application constraints may include at least one physical processor and physical memory that includes a group of modules and computer-executable instructions that, when executed by the physical processor, cause the physical processor to (1) receive, by a receiving module, a selection of age-based use constraints to be associated with one or more applications installed on the computing device, (2) associate, by an association module, the age-based use constraints with the applications, (3) determine, by a determining module, that a user attempting to access the applications, does not meet the age-based use constraints, and (4) perform, by a security module, a security action that restricts user access to the applications when the user does not meet the age-based use constraints.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a selection of age-based use constraints to be associated with one or more applications installed on the computing device, (2) associate the age-based use constraints with the applications, (3) determine that a user attempting to access the applications, does not meet the age-based use constraints, and (4) perform a security action that restricts user access to the applications when the user does not meet the age-based use constraints.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
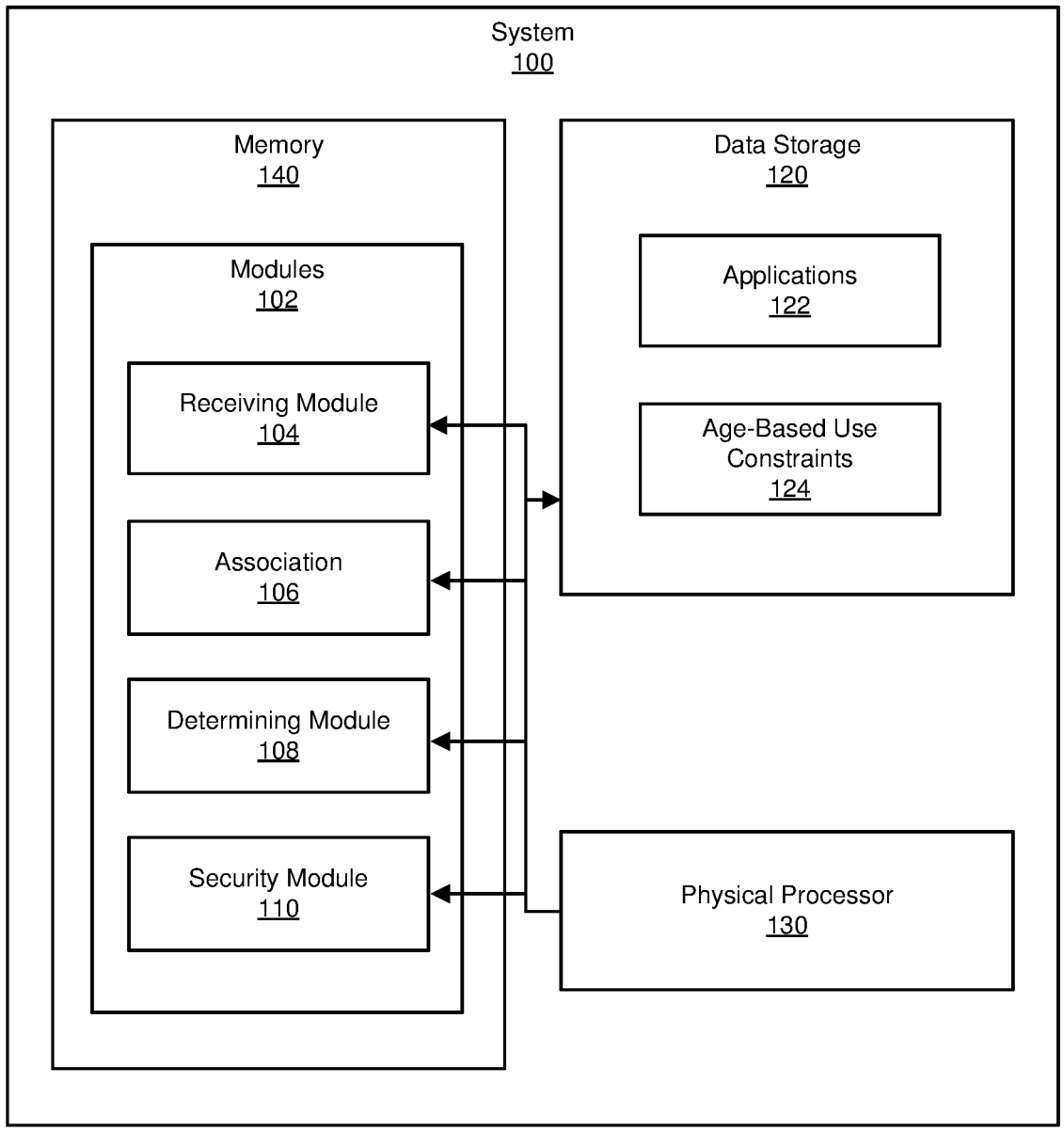
FIG. 1 is a block diagram of an example system for enforcing age-based application constraints.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enforcing age-based application constraints.

As will be explained in greater detail below, by associating age-based use constraints with applications on a computing device, the systems and methods described herein may utilize various recognition and detection techniques to identify attributes of users who do not meet the age-based use constraints and subsequently restrict access by concealing the applications in an application launcher on the computing device or by switching a device profile on the computing device to an age-based profile such that the applications/and or certain device privacy, security and utility settings, are only visible to users meeting the profile criteria.

In addition, the systems and methods described herein may improve the technical field of computer security by protecting user privacy with respect to inappropriate access of age-based applications. Traditional computer security solutions, which apply age-based restrictions by requiring user intervention to individually lock applications, may often fail to provide adequate privacy protection as these solutions may include notifications from age-controlled applications that are displayed on a computing device thereby identifying the applications to any users having access to the computing device.

Figure 2:
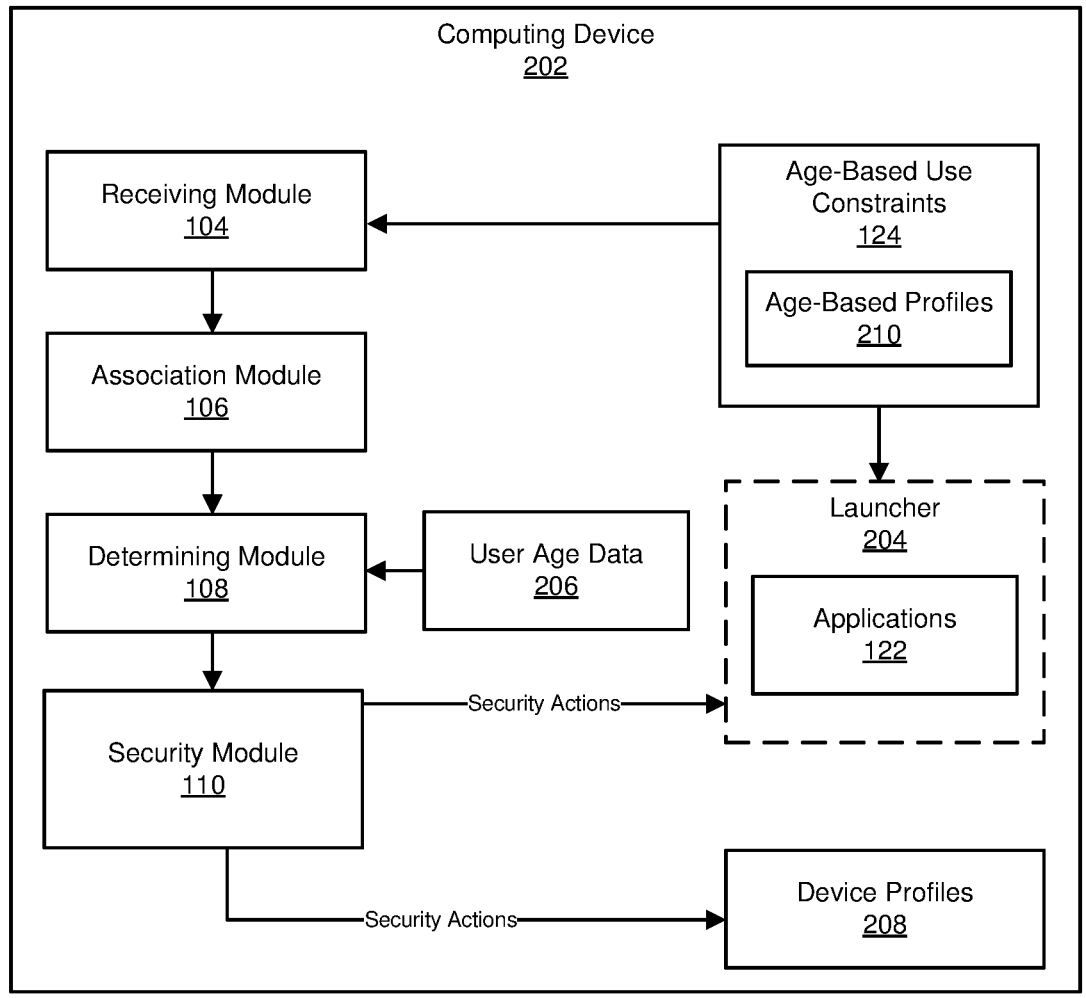
FIG. 2 is a block diagram of an additional example system for enforcing age-based application constraints.

The following will provide, with reference to FIGS. 1-2, detailed descriptions of example systems for enforcing age-based application constraints. Detailed descriptions of corresponding computer-implemented methods will also be provided in connection with FIG. 3. Detailed descriptions of example security actions for enforcing age-based application constraints will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for enforcing age-based application constraints. As illustrated in this figure, example system 100 may include one or more modules 102 for performing one or more tasks. For example, and as will be explained in greater detail below, example system 100 may include a receiving module 104 that receives a selection of age-based use constraints 124 to be associated with one or more applications 122 installed on a computing device. Example system 100 may additionally include an association module 106 that associates age-based use constraints 124 with applications 122. Example system 100 may also include a determining module 108 that determines that a user attempting to access applications 122 does not meet age-based use constraints 124. Example system 100 may additionally include a security module 110 that performs a security action that restricts user access to applications 122 when the user does not meet age-based use constraints 124. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 illustrated in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing age-based application constraints. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store applications 122 and age-based use constraints 124 on a computing device.

Example system 100 in FIG. 1 may be implemented in a variety of ways. For example, all or a portion of example system 100 may represent portions of example system 200 in FIG. 2. As shown in FIG. 2, system 200 may include computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to enforce age-based application constraints.

Computing device 202 generally represents any type or form of computing device capable of reading computer-executable instructions. In some examples, computing device 202 may represent a mobile endpoint device running client-side security software. In other embodiments, computing device 202 may represent a server. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Launcher 204 generally represents any type or form of application launcher on a computing device. In some examples, launcher 204 may be configured to display and launch applications 122 for use on computing device 202. In some examples, launcher 204 may be a part of a mobile operating system which may include, without limitation, the ANDROID or IOS operating systems. User age data 206 generally represents any type or form of data that may be utilized to determine the age of a potential user of applications 122 on computing device 202. In some examples, user age data 206 may be user facial or voice recognition data. In other examples, user age data 206 may be determined from validating user fingerprint data or other identifying information (e.g., a user's social security number) against a database to determine a user's age. In some embodiments, the aforementioned validation may be performed by as an exception handling mechanism to account for potential false positives utilizing face or voice recognition techniques to determine whether a user meets an age group threshold for accessing applications 122.

Device profiles 208 generally represents any type or form of control data for enabling or restricting various settings on a computing device. In some examples, device profiles 208 may be mobile device profiles for adding, changing, and/or removing various settings on a mobile computing device. Age-based profiles 210 generally represents any device profile that enables or restricts access to applications 122 (and/or other settings) on computing device 202 based on user age data 206.

Figure 3:
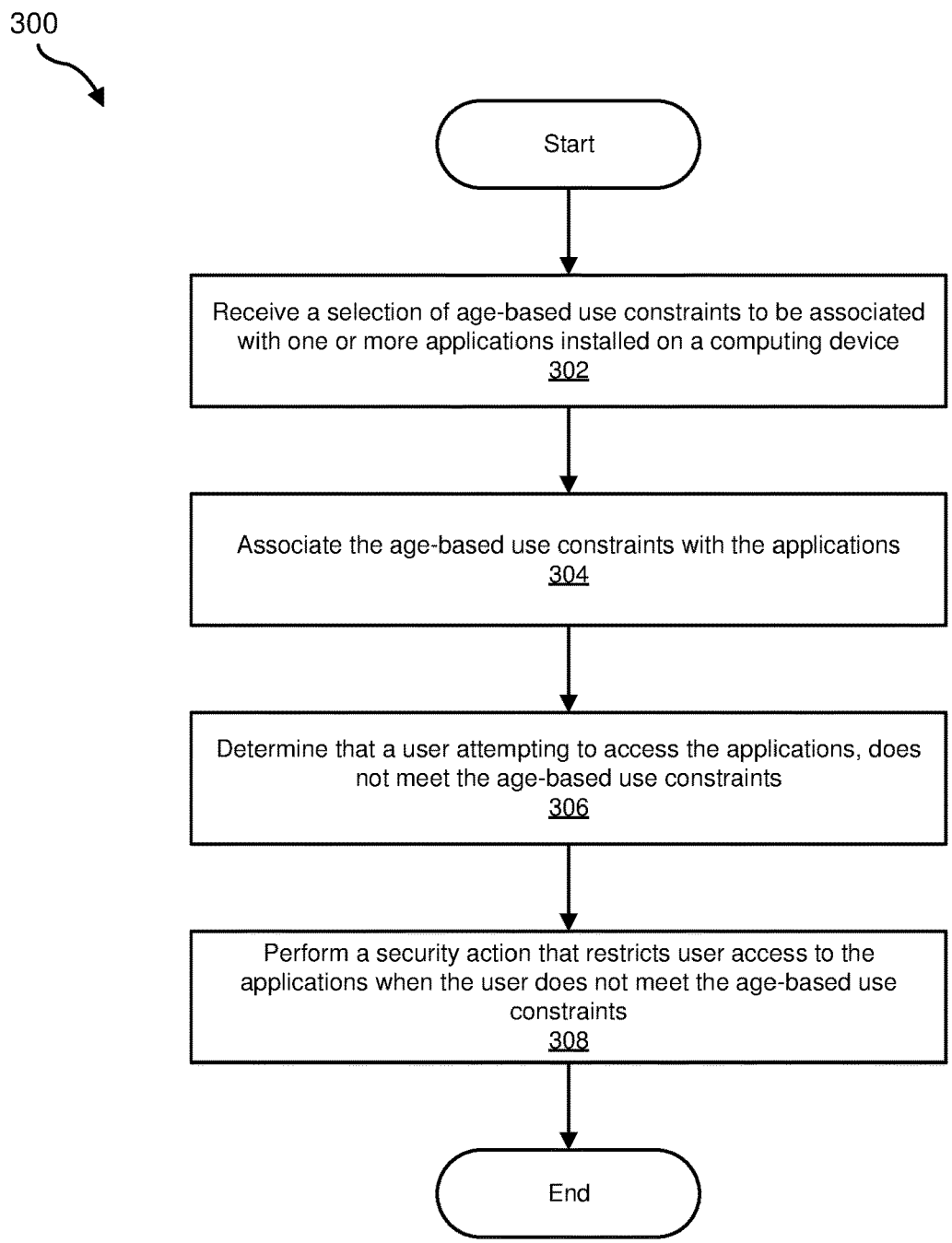
FIG. 3 is a flow diagram of an example method for enforcing age-based application constraints.

FIG. 3 is a flow diagram of an example computer-implemented method 300 for enforcing age-based application constraints. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a selection of age-based use constraints to be associated with one or more applications installed on a computing device. For example, receiving module 104 may, as part of computing device 202 in FIG. 2, receive a selection of age-based use constraints 124 to be associated with one or more applications 122.

The term "age-based use constraints," as used herein, generally refers to any age-based restrictions or limitations that may be associated with one or more applications and/or application categories on a computing device. In some examples, age-based use constraints may define certain applications and/or applications categories to only be accessed by a certain age group (e.g., adults over twenty-one years of age). In some examples, age-based use constraints may include age-based profiles 210.

Receiving module 104 may receive age-based use constraints 124 in a variety of ways. For example, receiving module 104 may receive information from an owner of computing device 202 identifying one or more applications 122 that the owner wishes to only be accessed by users within a certain age group (e.g., users between 21 and 59 years of age). Additionally or alternatively, receiving module 104 may receive information from an owner of computing device 202 identifying one or more categories containing applications 122 that the owner wishes to only be accessed by users within a certain age group. Additionally or alternatively, receiving module 104 may receive age-based profiles 210 stored in age-based use constraints 124.

At step 304, one or more of the systems described herein may associate the age-based use constraints with the applications. For example, association module 106 may, as part of computing device 202 in FIG. 2, associate age-based use constraints 124 with applications 122.

Association module 106 may associate age-based use constraints 124 in a variety of ways. For example, association module 106 may extend the capabilities of launcher 204 to incorporate age-based use constraints 124 such that when launcher 204 is accessed by a non-permitted age group, launcher 204 may be configured to perform a security action preventing access to applications 122 controlled by launcher 204. Additionally or alternatively, association module 106 may extend the capabilities of launcher 204 to incorporate age-based profiles 210 such that when launcher 204 is accessed by a non-permitted age group, launcher 204 may be configured to perform a security action preventing access to applications 122 controlled by launcher 204 based on an age group defined by age-based profiles 210.

At step 306, one or more of the systems described herein may determine that a user attempting to access the applications, does not meet the age-based use constraints. For example, determining module 108 may, as part of computing device 202 in FIG. 2, determine that a user attempting to access applications 122 does not meet age-based use constraints 124.

Determining module 108 may determine that a user does not meet age-based use constraints 124 in a variety of ways. For example, determining module 108 may receive a user request to access applications 122 and determine, based on user age data 206, that the age of the user requesting to access applications 122 is below a threshold. In some examples, user age data 206 may represent data indicating an age or age group of a user based on various recognition and identification techniques. In one example, determining module 108 may be configured to collect user age data 206 by performing user facial recognition on computing device 202. Additionally or alternatively, determining module 108 may be configured to collect user age data 206 by performing user voice recognition on computing device 202. Additionally or alternatively, determining module 108 may be configured to collect user age data 206 by performing user fingerprint detection on computing device 202 and validating the fingerprint detection against a database including the user's age. Additionally or alternatively, determining module 108 may be configured to collect user age data 206 by retrieving user identification data (e.g., a social security number) on computing device 202 and validating this information against a database including the user's age. In some embodiments, the validations may be performed by determining module 108 as an exception handling mechanism to account for potential false positives utilizing face or voice recognition techniques to determine whether a user meets an age group threshold for accessing applications 122.

At step 308, one or more of the systems described herein may perform a security action that restricts user access to the applications when the user does not meet the age-based use constraints. For example, security module 110 may, as part of computing device 202 in FIG. 2, perform a security action that restricts user access to applications 122 when the user does not meet age-based use constraints 210.

Figure 4:
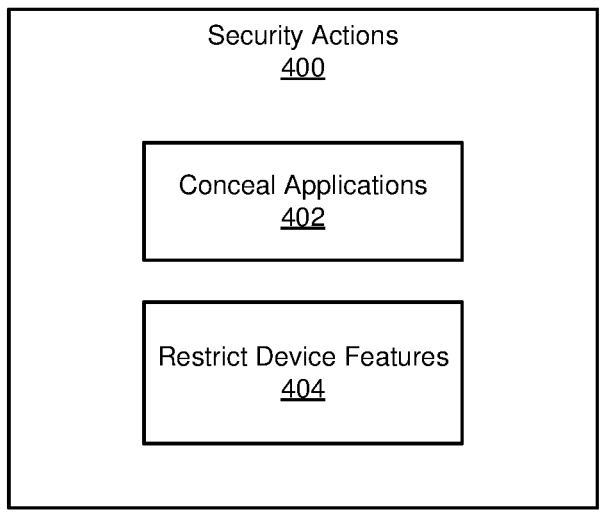
FIG. 4 is a block diagram of example security actions for enforcing age-based application constraints.

Security module 110 may perform a variety of security actions to restrict user access to applications 122 when a user does not meet age-based use constraints 210. For example, FIG. 4 shows example security actions 400 that may be performed by security module 110. In some embodiments, security actions 400 may include a conceal applications action 402 and/or a restrict device features action 404.

In some examples, security module 110 may perform conceal applications action 402 by concealing applications 122 in launcher 204 to prevent user access. In some embodiments, security module 110 may conceal applications 122 by sandboxing the launcher such that applications 122 are no longer visible to the user.

The term "sandboxing the launcher," as used herein, generally refers to any operating system launcher application that implements functionality distinct from a traditional application launcher. For example, a sandboxed launcher may be configured to take the place of an existing traditional launcher, such that the sandboxed launcher is seen by the operating system as a valid launcher, without implementing any traditional launcher functionality. Instead, the sandboxed launcher may be configured with programming hooks to intercept and/or modify traditional launcher flows and behaviors such that applications may be hidden/shown, blocked/unblocked, altered in appearance, and/or sub-sandboxed, thus applying all sub-sandboxing capabilities and features.

In some examples, security module 110 may perform conceal applications action 402 by switching a current device profile 208 on computing device 202 to an age-based profile 210 and then hiding applications 122 (e.g., by sandboxing launcher 204) based on the profile. In some embodiments, security module 110 may recommend age-based profiles 210, based on existing settings associated with applications 122 (e.g., settings indicating that one or more applications 122 are not meant for certain age groups) upon installation of modules 102 on computing device 202. In some examples, security module 110 may switch a current device profile 208 to an age-based profile 210 by modifying a current device profile (e.g., a device profile 208 or a previously created age-based profile 210). In some examples, a user (e.g., a device owner) of computing device 202 may modify an existing age-specific profile attribute in a profile to create a custom or new age-based profile 210. For example, if a user originally had a CHILD age-based profile created (e.g., for children between 13 and 18) based on a recommendation by security module 110, and now wants a more controlled CHILD age-based profile (e.g., for children 6 and 12) to cover a different age group, the user may create a new age-based profile 210 to add to the existing age-based profile recommended by security module 110. In some example, security module 110 may be configured to automatically create age-based profiles 210 when a user of a specific age group is detected (based on user age data 206) and an age-based profile 210 for that age group does not exist.

In some examples, security module 110 may perform restrict device features action 404 additionally or alternatively to conceal applications action 402. In some embodiments, after switching a current device profile 208 on computing device 202 to an age-based profile 210, security module 110 may be configured to restrict various device settings on computing device 202 that are associated with accessing applications 122, based on the profile. In some embodiments, security module 110 may be configured to restrict, without limitation, device privacy settings (e.g., camera settings, Wi-Fi settings, etc.), device security settings (e.g., NFC settings, etc.), and/or device utility settings (e.g., font size, screen brightness, volume, application permission control settings, etc.). For example, if an age-based profile 210 for age group 3-5 places a restriction on a camera associated with computing device 202, and if a child in this age group uses computing device 202, then security module 110 would apply age-based profile 210 and a camera application on computing device 202 would not be available to the child. As another example, if an age-based profile 210 for age group 60-70 restricts a device font size on computing device 202 to only display applications 122 in a large font, when a user in this age group uses an application 122 on computing device 202, the increased font size would be automatically applied.

As explained in connection with method 300 above, the systems and methods described herein may conceal computing device applications based on application and/or application category configured age constraints and further utilize age-based profile switching for mobile endpoints using facial and/or voice attributes. By using facial recognition, voice recognition, fingerprint detection and identification (e.g., social security number) validation, as well as other techniques to determine the age of users attempting to access age-based applications (as well as computing device privacy, security, and utility settings), the systems and methods described herein may be able to restrict access to these applications and device settings without alerting users to the presence of age-inappropriate applications and/or application categories, thereby maintaining computing device privacy.

Figure 5:
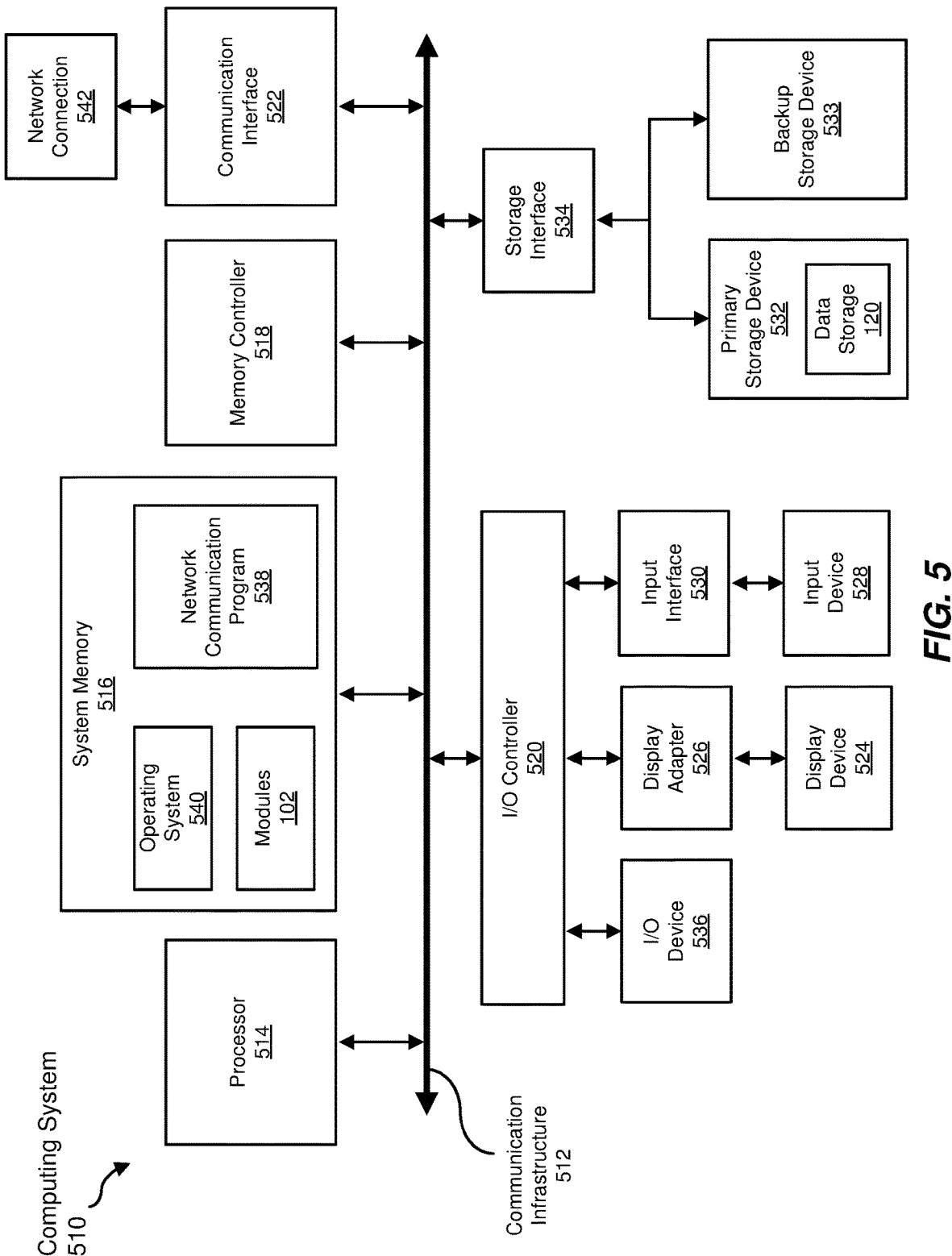
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, data storage 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
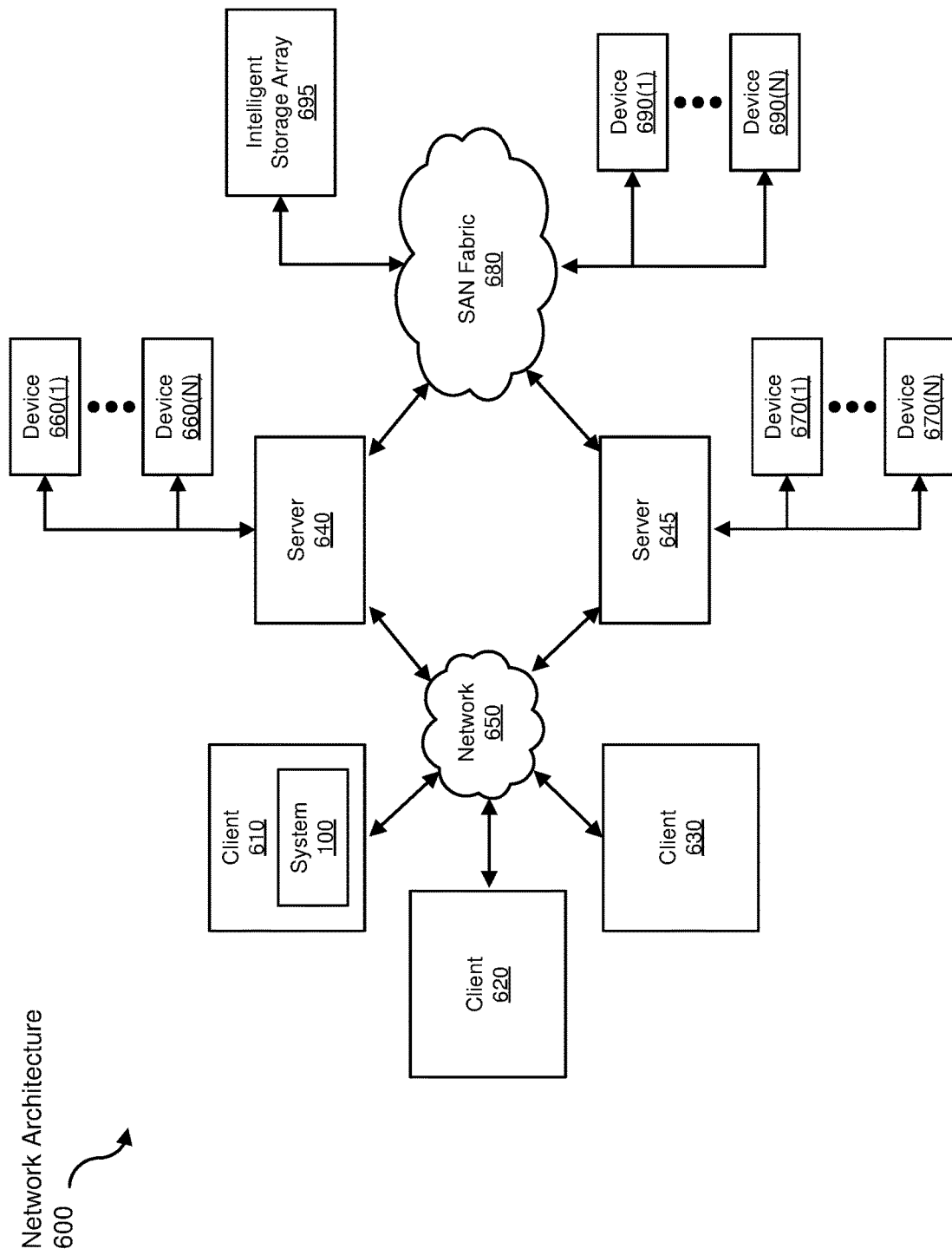
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for enforcing age-based application constraints.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing age-based application constraints, at least a portion of the method being performed by a computing device comprising at least one processor, the method comprising:
   receiving, by the computing device, a selection of age-based use constraints to be associated with one or more applications installed on the computing device;
   associating, by the computing device, the age-based use constraints with the applications;
   determining, by the computing device, that a user attempting to access the applications does not meet the age-based use constraints; and
   performing, by the computing device, a security action that restricts user access to the applications when the user does not meet the age-based use constraints, wherein the user access to the applications is restricted by:
      applying the age-based use constraints to a sandboxed launcher associated with accessing the applications; and
      utilizing the sandboxed launcher to conceal the applications by intercepting one or more program flows and behaviors utilized by a default launcher associated with accessing the applications and hiding the applications from view on the computing device.

2. The computer-implemented method of claim 1, wherein the age-based use constraints comprise an age-based profile.

3. The computer-implemented method of claim 2, wherein performing the security action further comprises:
   switching a current device profile on the computing device to the age-based profile; and
   restricting the user access to the applications based on the age-based profile.

4. The computer-implemented method of claim 3, wherein switching the current device profile comprises at least one of:
   modifying the current device profile to the age-based profile; and
   creating the age-based profile.

5. The computer-implemented method of claim 3, wherein restricting the user access to the applications comprises:
   restricting one or more features of the computing device associated with accessing the applications.

6. The computer-implemented method of claim 5, wherein restricting one or more features of the computing device associated with accessing the applications comprises restricting one or more device privacy settings on the computing device.

7. The computer-implemented method of claim 5, wherein restricting one or more features of the computing device associated with accessing the applications comprises restricting one or more device security settings on the computing device.

8. The computer-implemented method of claim 5, wherein restricting one or more features of the computing device associated with accessing the applications comprises restricting one or more device utility settings on the computing device.

9. The computer-implemented method of claim 1, wherein determining that the user attempting to access the applications does not meet the age-based use constraints comprises:

receiving a user request to access the applications; and
determining that an age of the user requesting to access the applications is below a threshold.

10. The computer-implemented method of claim 9, wherein determining that the age of the user attempting to access the applications is below the threshold comprises determining the age of the user based on at least one of:
user facial recognition;
user voice recognition;
user fingerprint detection; and
user identification data.

11. The computer-implemented method of claim 1, wherein the applications comprise one or more application categories.

12. A system for enforcing age-based application constraints, the system comprising:
at least one physical processor;
physical memory comprising a plurality of modules and computer-executable instructions that, when executed by the physical processor, cause the physical processor to:
receive, by a receiving module, a selection of age-based use constraints and an age-based profile to be associated with one or more applications installed on a computing device;
associate, by an association module, the age-based use constraints with the applications;
determine, by a determining module, that a user attempting to access the applications, does not meet the age-based use constraints; and
perform, by a security module, a security action that restricts user access to the applications when the user does not meet the age-based use constraints, wherein the user access to the applications is restricted by:
applying the age-based use constraints to a sandboxed launcher associated with accessing the applications; and
utilizing the sandboxed launcher to conceal the applications by intercepting one or more program flows and behaviors utilized by a default launcher associated with accessing the applications and hiding the applications from view on the computing device.

13. The system of claim 12, wherein the age-based use constraints comprise an age-based profile.

14. The system of claim 13, wherein the security module further performs the security action by:
switching a current device profile on the computing device to the age-based profile; and
restricting the user access to the applications based on the age-based profile.

15. The system of claim 14, wherein the security module switches the current device profile by at least one of:
modifying the current device profile to the age-based profile; and
creating the age-based profile.

16. The system of claim 14, wherein the security module restricts the user access to the applications by:
restricting one or more features of the computing device associated with accessing the applications.

17. The system of claim 16, wherein restricting one or more features of the computing device associated with accessing the applications comprises restricting one or more device privacy settings on the computing device.

18. The system of claim 12, wherein the determining module determines that the user attempting to access the applications does not meet the age-based use constraints by:
receiving a user request to access the applications; and
determining that an age of the user requesting to access the applications is below a threshold.

19. The system of claim 18, wherein the determining module determines that the age of the user attempting to access the applications is below the threshold by determining the age of the user based on at least one of:
user facial recognition;
user voice recognition;
user fingerprint detection; and
user identification data.

20. A non-transitory computer-readable medium comprising one or more computer-executable instructions that, when executed by at least one processor of a computing device, cause the computing device to:
receive a selection of age-based use constraints to be associated with one or more applications installed on the computing device;
associate the age-based use constraints with the applications;
determine that a user attempting to access the applications, does not meet the age-based use constraints; and
perform a security action that restricts user access to the applications when the user does not meet the age-based use constraints, wherein the user access to the applications is restricted by:
applying the age-based use constraints to a sandboxed launcher associated with accessing the applications; and
utilizing the sandboxed launcher to conceal the applications by intercepting one or more program flows and behaviors utilized by a default launcher associated with accessing the applications and hiding the applications from view on the computing device.

* * * * *